Dec. 19, 1933.  P. SALTZMAN ET AL  1,940,019
SLOTTER
Filed July 27, 1929   5 Sheets-Sheet 1

Inventors
Paul Saltzman
and Robert Millar,
By
Attorney.

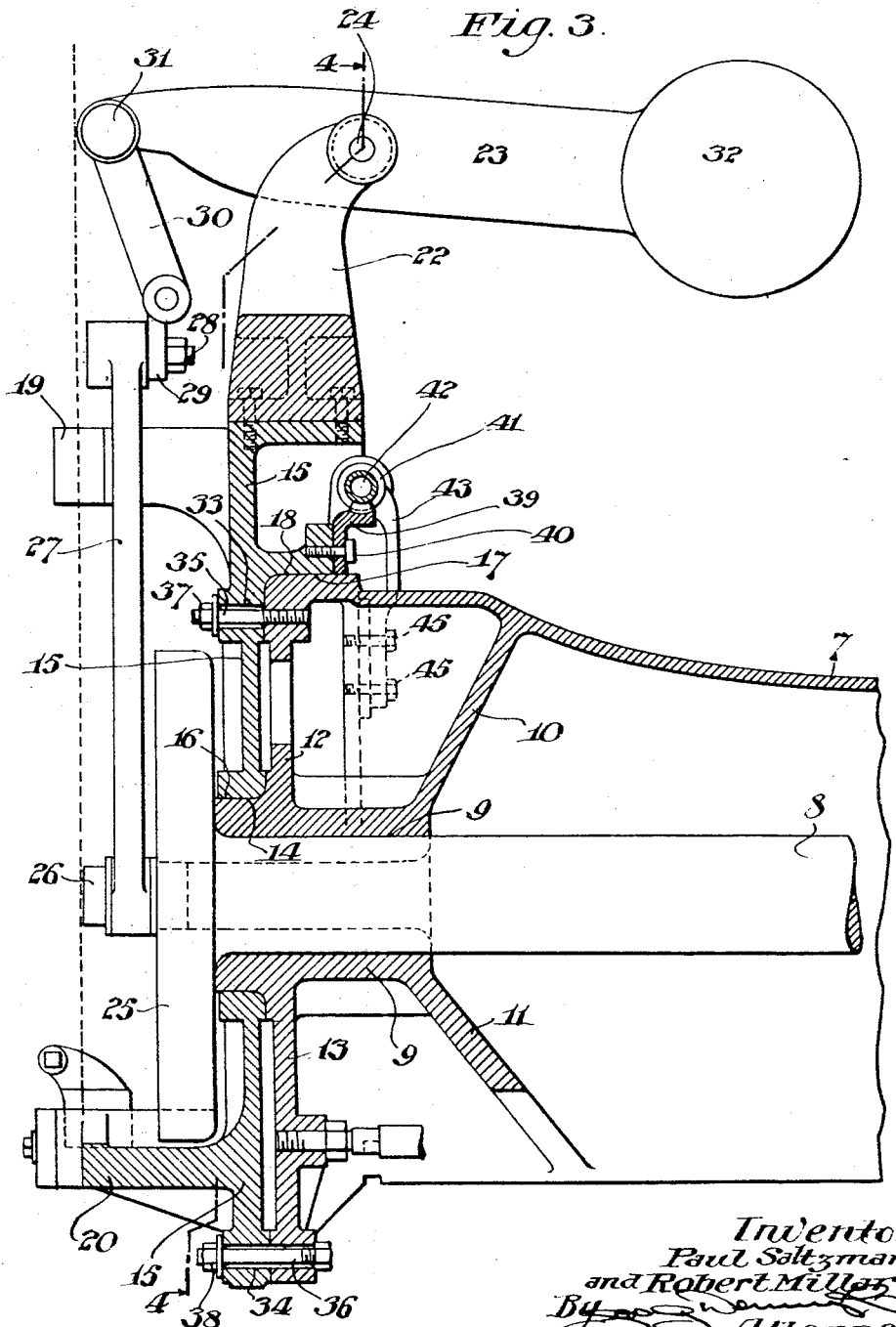

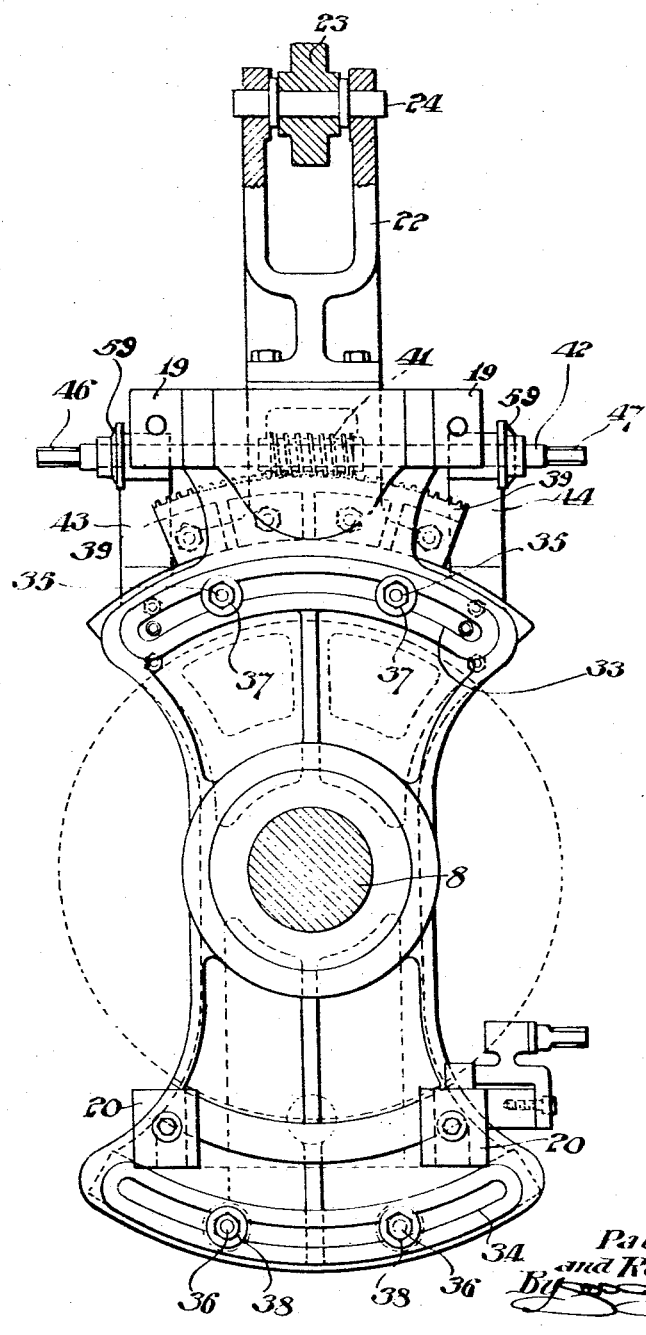

Dec. 19, 1933.  P. SALTZMAN ET AL  1,940,019
SLOTTER
Filed July 27, 1929  5 Sheets-Sheet 4

Inventors
Paul Saltzman
and Robert Millar,
By
Attorney

Dec. 19, 1933.    P. SALTZMAN ET AL    1,940,019
SLOTTER
Filed July 27, 1929    5 Sheets-Sheet 5

Inventors:
Paul Saltzman
and Robert Millar,
By
Attorney.

Patented Dec. 19, 1933

1,940,019

UNITED STATES PATENT OFFICE 1,940,019

SLOTTER

Paul Saltzman and Robert A. Millar, Philadelphia, Pa., assignors to Nazel Engineering & Machine Works, Philadelphia, Pa., a corporation of Pennsylvania Application July 27, 1929. Serial No. 381,474

4 Claims. (Cl. 90—43)

Our invention relates to slotting machines of the type having a stationary working support disposed generally horizontally and having a generally upright and reciprocable ram and tool carried thereby, adapted to remove metal from the "work" by a successive series of adjacent straight line cuts effected by the straight line reciprocation of the tool in a constant path and the stationary and rigid support of the "work" during the cutting stroke, and the suitable slight parallel displacement of the work during the return stroke of the tool, so as to position the former for the next succeeding cutting stroke of the latter.

Thus, our invention relates to slotters of this general type adapted for finishing any plain or cylindrical surface which may be developed by a straight line as, for instance, the finishing of bosses and pads, and the cutting of slots and key-ways and the like.

Our invention relates more particularly to a novel angularly adjustable ram in slotting machines of this general type, whereby the direction of the stroke of the ram and tool of the machine may be adjusted to any desired degree (within suitable limits) so as to permit the cutting of slots, channels and surfaces at various angles to the table of the machine, as well as at a right angle thereto.

Thus, if it is desired to cut an inclined slot or surface into or upon a machine element such as a casting or the like; instead of mounting the "work" upon the table at the particular angle, so as to position the slot or surface to be cut, perpendicularly to the table, the machine element or "work" may be mounted horizontally upon the table of our novel slotting machine, supported directly upon any suitable surface or surfaces on such machine element or "work", and the ram of our novel slotting machine may then be adjusted angularly to any suitable degree (within limits), so as to cut the slot or surface on the "work" at the desired angle or inclination.

With the above ends in view, our novel slotter may be provided with any conventional horizontal travelling table, suitably adapted for intermittent longitudinal, transverse and or rotary displacement, at various suitable rates, and a horizontal head adjustably mounted upon and carried by an upright frame member and overhanging the "work" table, and adapted to carry and support at its overhanging end, a reciprocable tool ram in operative juxtaposition to said horizontal "work" table.

For the purpose of illustrating our invention, we have shown in the accompanying drawings the forms thereof which are preferred by us; since they have been found by practice to give satisfactory and reliable results, although it is to be understood that the various instrumentalities of which our invention consists, can be variously arranged and organized, and that our invention is not limited to the several precise arrangements and organizations of these instrumentalities as herein shown and described.

Referring to our drawings, in which like reference characters indicate like parts:

Figure 3 represents a vertical, longitudinal sectional view of the ram and a portion of the head of our novel slotter taken on line 3—3 of Figure 2, on an enlarged scale.

Figure 4 represents a front elevation, on an enlarged scale, of the angularly adjustable ram supporting frame member, partly in section on line 4—4 of Figure 3.

Figure 1:
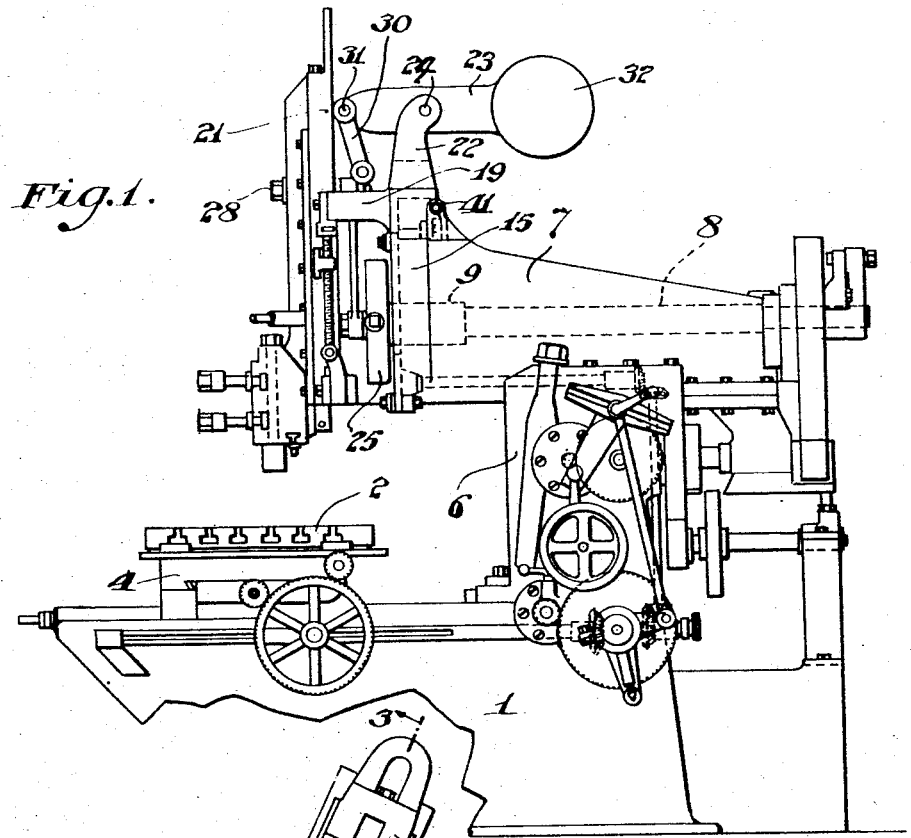
Figure 1 represents a side elevation of the slotter embodying our invention.

In carrying out our invention we may employ a base 1, of conventional construction, having mounted thereon the horizontal work table 2, upon a suitable longitudinal carriage 3 and transverse carriage 4, and being suitably pivoted at its center upon the latter, so as to permit of the longitudinal, transverse, as well as angular displacement of the table 2 in a horizontal plane.

The feeding mechanism or means for intermittently displacing or "feeding" the table 2 longitudinally or transversely and/or angularly, may also be the conventional means heretofore employed and illustrated in the drawings; to which no special reference is made herein.

Upon the base 1 the upright frame member or standard 6 is provided, (of a conventional construction) in and upon which, table-feeding means and tool ram driving means are provided, also of a conventional construction.

The elongated head 7 of the machine is slidably mounted on top of the upright member or standard 6, in suitable horizontal guides and projects horizontally and overhangs the work table 2. By adjusting the head 7 upon the upright frame member 6, the overhanging end of the same may be spaced horizontally with respect to the table 2.

Within the head 7, and extending longitudinally thereof, a main drive shaft 8 is suitably mounted. The main drive shaft 8 is adapted to be revolved or driven at any one of several different speeds, through suitable speed change driving mechanism of conventional construction not herein particularly referred to.

According to our novel construction the overhanging or ram end of the head 7 is provided with a horizontal main bearing member or journal 9, disposed longitudinally of the head and supported at the end of the hollow cast frame of the head 7, by suitable integral webs 10, 11, 12 and 13 respectively, as illustrated more particularly in Figure 3.

The outer end of the bearing or journal member 9 is provided with an external cylindrical bearing surface 14, coaxial with the internal bearing surface thereof, which supports the main shaft 8. The outer bearing surface 14 serves as a pivotal bearing support for the ram slide frame member 15, which is provided with a corresponding internal bearing opening 16 which is journaled upon the stationary outer bearing surface 14.

An upper cylindrical bearing surface 17 is also provided upon the top of the head frame coaxial with the bearing surface 14, while the ram slide frame member 15 is provided with a corresponding bearing surface 18 in juxtaposition to the stationary bearing surface 17, so as to provide additional support for the ram slide frame member and ram.

Figure 2:
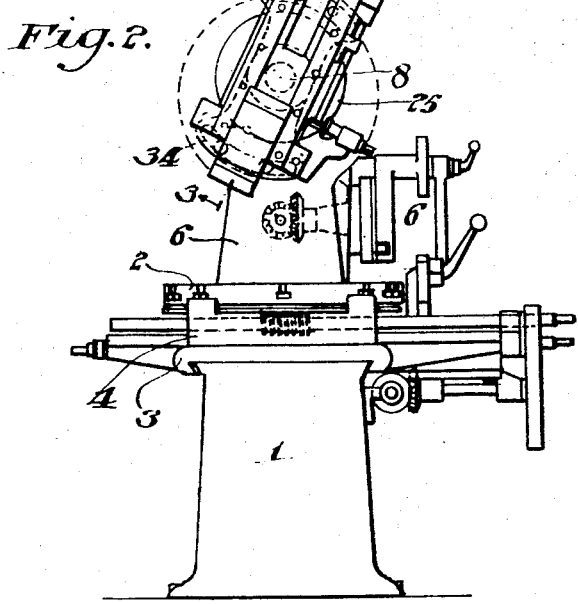
Figure 2 represents a front elevation of the same.

A pair of top and a pair of bottom lateral brackets 19 and 20 respectively, are formed integrally with the ram slide frame member 15, and upon the free ends of these lateral brackets 19 and 20, the ram slide 21 is suitably mounted. (See Figures 1 and 2). On the top of the ram slide frame 15, an upright counterweight bracket 22 is secured, on which a counterweight arm 23 is pivotally supported at 24.

The main drive shaft 8 terminates at its front end in a crank disk 25, which carries the eccentric crank pin 26.

A connecting rod 27 interconnects the crank pin 26 with a suitable crosshead pin 28 on the ram. Through the connecting rod 27, the rotary motion of the main shaft 8 imparts a reciprocating motion to the ram 21. A pivot link 29 is pivotally secured to the upper end of the connecting rod 27, and to the upper part of said link 29, a connecting link 30 is pivotally secured to the pivotal connection with the connecting rod. The upper end of the connecting link 30 is pivotally secured to the front end of the counterweight arm 23, at a point 31, thereby providing a pivotal connection between the ram and the counterweight 32.

Arcuate slots 33 and 34 are provided at the top and bottom respectively in the pivotally mounted ram supporting frame member 15; having their center at the pivotal center of said frame. Pairs of bolts 35 and 36 extend through said arcuate slots 33 and 34 respectively, and are fixedly anchored in the head frame 7 of the machine.

By means of corresponding nuts or other fastening means 37 and 38 respectively, the pivotally mounted ram supporting frame member 15, may be locked in any desired angular position or relation with respect to the head frame 7 (within the limits of its angular adjustment).

In order to permit of a more accurate and ready angular adjustment of the ram supporting frame member 15 and of the ram carried thereby, a worm gear sector 39 of suitable arcuate extent, is secured to the top of the ram supporting frame member 15, by means of a series of bolts 40. A corresponding worm 41, carried by a horizontal adjustment shaft 42 is supported upon a pair of journal brackets 43 and 44 respectively, attached to the head frame 7 by the bolts 45. The worm 41 is permanently in mesh with the worm gear sector 40. The two projecting ends 46 and 47 of the adjustment shaft 42 are provided with square or other suitable shanks for the reception of a detachable handle member (not shown in the drawings), whereby said shaft may be revolved for the purpose of adjustment.

The ram adjustment and ram slide adjustment are of conventional form and construction, and likewise the clapper box and tool yokes and clamps on the lower end of the ram are also of conventional construction.

Figure 5:
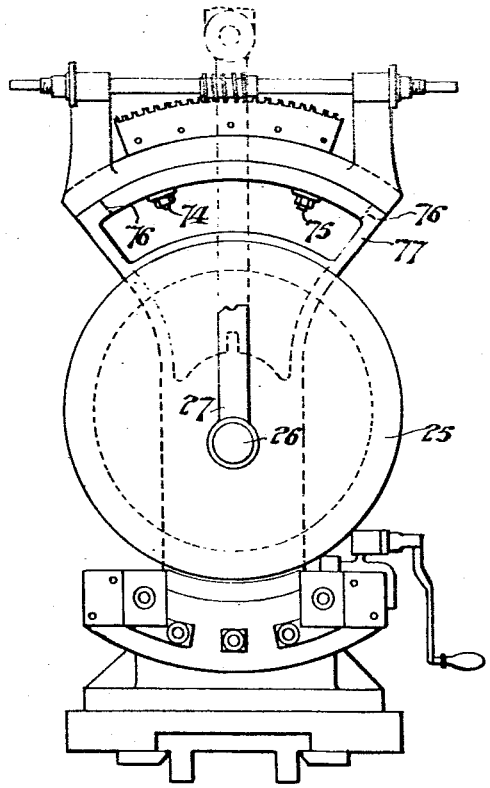
Figure 5 represents a front elevation of an angularly adjustable ram supporting frame member of a modified construction, also embodying our invention.

In Figure 5 we have illustrated another modified embodiment of our invention, in which the upper locking bolts 74 and 75 are arranged radially, and extend through a corresponding radially disposed slot 76 in the pivoted frame member 77.

Figure 6:
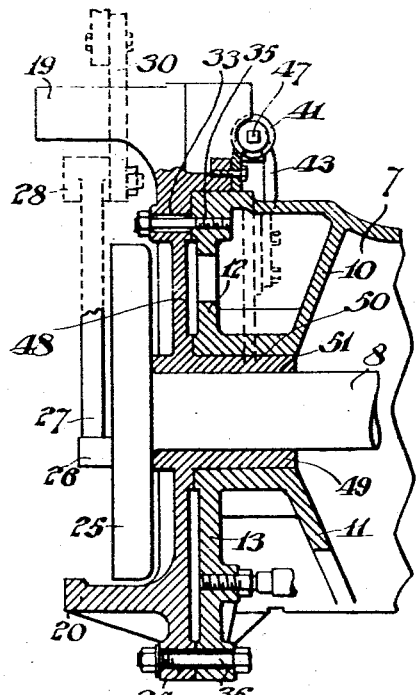
Figure 6 represents a vertical section of an angularly adjustable ram supporting frame member of another modified construction embodying our invention.

In Figure 6 we have illustrated a modified form of construction in which the main or central pivotal support for the ram slide frame member 48 is provided by a cylindrical bushing or bearing member 49 formed integrally with the ram slide frame member 48, which projects into and is journalled within the main front bearing 9 in the head frame 7. The main shaft 8 is then in turn journalled in the inner cylindrical bearing 51 within the bushing or journal member 49. In this modified construction also embodying our invention, the ram slide and ram are similarly supported and the ram slide supporting frame 48 is similarly adjusted and locked in position.

Figure 7:
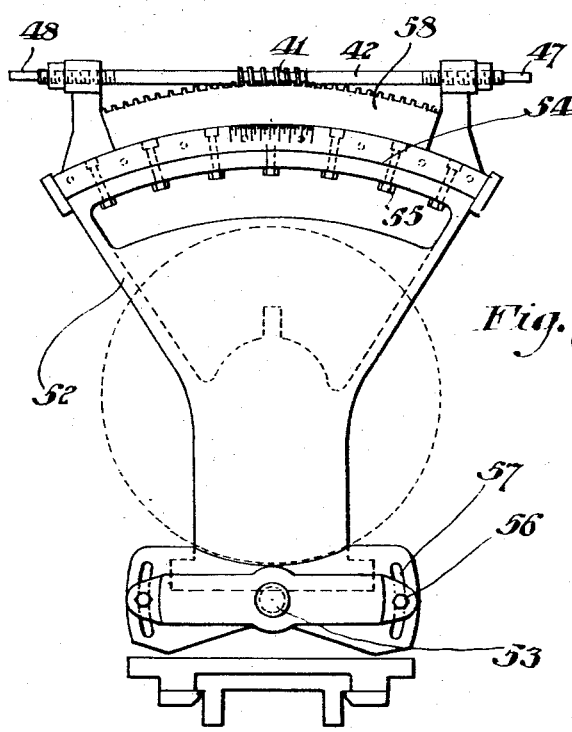
Figure 7 represents a front elevation of an angularly adjustable ram supporting frame member of another modified construction, also embodying our invention.

In Figure 7 we have illustrated a still further modified construction embodying our invention, in which the pivotal center of the ram slide supporting frame 52 is at a point below the axis of the main shaft 8, to wit: at a point 53. In this modified construction the auxiliary arcuate supporting or bearing surfaces 54, at the top of the head frame 7 and the frame 52 are centered about the pivot 53, instead of the axis of the main shaft 8 as in the case of the bearing surfaces 17 and 18 (Figure 3). In this modified construction, moreover, the ram slide frame member 52 is locked in position by a plurality of radially disposed bolts 55 and a pair of lower horizontal bolts 56 extending through suitable arcuate openings 57 in the ram slide frame member 52. The worm gear sector 58 in this modification is similarly centered about the pivot 53.

Any suitable indicator dial may be provided upon the ram slide frame member or upon the stationary head frame member for the purpose of indicating the angular position of the ram slide frame member and ram. For a still finer angular adjustment additional dials 59 (Fig. 4) may be provided either on the worm shaft 42 or upon the stationary bearing member supporting said shaft, with a suitable pointer on the corresponding part; said auxiliary dial 59 being suitably calibrated with respect to the pitch of the worm 41 and worm gear sector 39, so as to permit the accurate adjustment of the ram slide frame member to small fractions of a degree.

If desired, a suitable vernier dial may be provided in juxtaposition to the auxiliary indicator dial 59 for a still finer angular adjustment.

Figure 8:
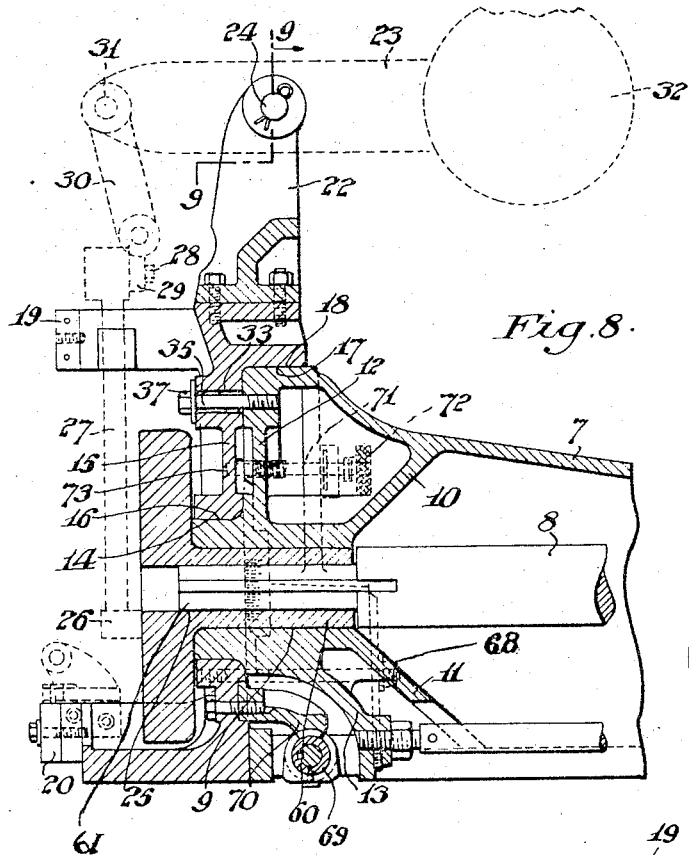
Figure 8 represents a vertical longitudinal section of an angularly adjustable ram supporting frame member of another modified construction, also embodying our invention.
Figure 9:
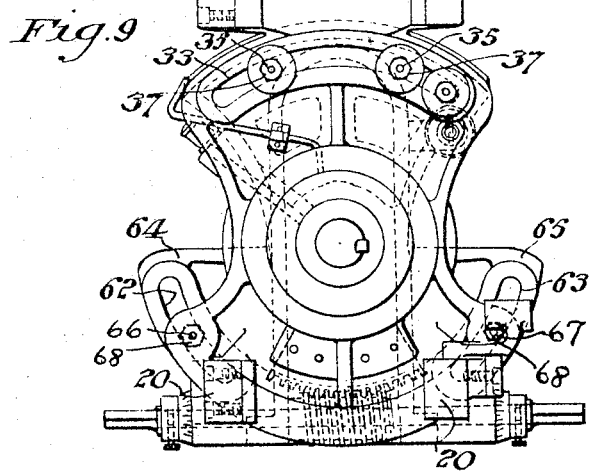
Figure 9 represents a front elevation of the same, partly in section on line 9—9 of Figure 8.

In Figures 8 and 9 we have illustrated a further modified embodiment of our invention. In this embodiment of our invention, the hub 60 of the crank disc 25 is journalled in the main bearing 9, while the front end 61 of the main drive shaft 8 is reduced and keyed in the hub 60.

In this modification also, the arcuate slots for receiving the bolts which lock the pivoted ram supporting frame member 15, are differently arranged. Thus a pair of lower arcuate slots 62 and 63 are provided in a corresponding pair of lateral projections 64 and 65 of the front end of the elongated head 7 of the machine. A pair of bolts 66 and 67 extend through the arcuate slots 62 and 63 and are threadedly anchored in the pivoted frame member 15. A nut 68 on each of the bolts 66 and 67 serves to lock the frame member 15. The upper arcuate slot 33, bolts 35 and nuts 37 are arranged as in the modification portrayed in Figures 1 to 4 inclusive.

In the particular modified embodiment of our invention shown in Figures 8 and 9, the adjustment worm and gear sector 69 and 70 respectively, are disposed beneath, instead of above the pivotal center of the ram-supporting frame member 15.

The spring bolt 71 mounted in the stationary head 7 of the machine, (having the head 72) is adapted to project into an arcuately aligned hole 73 in the pivoted frame member 15, which is arranged to register with the spring bolt 71 in a predetermined position of the pivoted frame member 15, thereby to constitute an accurate stop in such position;—as for instance in the vertical position.

We are aware that the invention may be embodied in other specific forms without departing from the spirit or essential attributes thereof, and we therefore desire the present embodiments to be considered in all respects as illustrative and not restrictive, reference being had to the appended claims rather than to the foregoing description to indicate the scope of the invention.

Having thus described our invention, what we claim as new and desire to secure by Letters Patent, is:—

1. In a slotter having a generally stationary frame, a main drive shaft carried by said frame, a reciprocable ram slidable transversely to said main drive shaft, and means operatively interconnecting said main drive shaft with said ram for driving the latter from the former in different angular positions of the ram, the improvements which consist of means forming an oscillatable slideway for said ram, a cylindrical bearing carried by said frame and on which said means is fulcrumed and on which it is movable in a plane transverse to the axis of said main drive shaft, and a convexly curved bearing carried by said frame and spaced above said bearing first named, said second named curved bearing having a surface concentric with the axis of rocking of said means, and said means having a concave bearing complementary to and engaging said second named curved bearing.

2. In a slotter having a generally stationary frame, a main drive shaft carried by said frame, a reciprocable ram slidable transversely to said main drive shaft, and means operatively interconnecting said main drive shaft with said ram for driving the latter from the former in different angular positions of the ram, the improvement which consists of means forming an oscillatable slideway for said ram, a cylindrical bearing carried by said frame and on which said means is pivotally supported, a convexly curved bearing on said frame spaced above said bearing first named and having a surface concentric with the pivotal axis of said means, and a concave bearing on said means conforming in contour with and engaging said convexly curved bearing.

3. In a slotter having a generally stationary frame, a main drive shaft carried by said frame, a reciprocable ram slidable transversely to said main drive shaft, and means operatively interconnecting said main drive shaft with said ram for driving the latter from the former in different angular positions of the ram, the improvement which consists in a housing forming an oscillatable slideway for said ram, a cylindrical bearing concentric with the axis of said main drive shaft and forming a pivotal support for said housing and a bearing forming a cylindrical segment on said frame and spaced above said pivotal support, said housing having a concave member engaging said second bearing, said frame and housing having contacting bearing surfaces normal to the axis of said shaft and disposed between said first and second named bearings, and a worm and gear adjacent to said second named bearing for oscillating said housing.

4. In a slotter having a generally stationary frame, a main drive shaft carried by said frame, a reciprocable ram slidable transversely to said main drive shaft, and means operatively interconnecting said main drive shaft with said ram for driving the latter from the former in different angular positions of the ram, the improvement which consists of means forming a slideway for said ram, a cylindrical bearing concentric with and disposed at the extreme outer end of said main drive shaft and forming a pivotal support for said means, a bearing carried by said frame and forming a segment of a cylindrical surface spaced above and concentric with said first named surface, said means having a bearing conforming with and engaging said second named bearing surface.

PAUL SALTZMAN.
ROBERT A. MILLAR.